(12) United States Patent
Ramsey et al.

(10) Patent No.: US 6,353,770 B1
(45) Date of Patent: Mar. 5, 2002

(54) APPARATUS AND METHOD FOR THE REMOTE PRODUCTION OF CUSTOMIZED CLOTHING

(75) Inventors: Philip J. Ramsey, Brookline, NH (US); Gerald S. Ruderman, Wellesley; Bethe M. Palmer, Marblehead, both of MA (US)

(73) Assignee: Levi Strauss & Co., San Francisco, CA (US)

( * ) Notice: Subject to any disclaimer, the term of this patent is extended or adjusted under 35 U.S.C. 154(b) by 0 days.

(21) Appl. No.: 09/320,166

(22) Filed: May 26, 1999

(51) Int. Cl.[7] .............................................. G06F 19/00

(52) U.S. Cl. ....................... 700/131; 700/130; 700/132; 700/133; 700/134; 700/135; 700/136; 33/12; 33/14; 33/15; 705/1; 705/10; 705/26; 707/4; 707/104

(58) Field of Search ................................. 700/131, 132, 700/130, 134, 133, 135, 136, 137, 155, 90, 87; 33/12, 14, 15; 705/1, 10, 7, 26; 707/4, 104

(56) References Cited

U.S. PATENT DOCUMENTS

| | | | |
|---|---|---|---|
| 358,903 A | 3/1887 | Weir | D26/110 |
| 633,654 A | 9/1899 | Melick | 33/15 |
| 1,121,410 A | 12/1914 | Scribante | 33/15 |
| 1,732,369 A | 10/1929 | Leeman | 33/16 |
| 2,231,437 A | 2/1941 | Cieri | 33/15 |
| 2,374,654 A | 5/1945 | Cooke | 33/15 |
| 2,615,250 A | 10/1952 | Fessler | 33/15 |
| 2,631,374 A | 3/1953 | Purdy | 33/2 R |
| 2,762,124 A | 9/1956 | Angelo | 33/16 |

(List continued on next page.)

FOREIGN PATENT DOCUMENTS

EP 0 537 388 A1 4/1993

OTHER PUBLICATIONS

Wayne et al., Measurement Of Garment Dimensions Using Machine Vision, 1990, IEEE, pp. 197–201.*
Moncarz et al., Report on scoping the apparel manufacturing enterprise, Aug. 18, 1994, internet, pp. 1–39.*
Norton–Wayne et al., Measurement of garment dimensions using machine vision, 1989, IEEE, pp. 197–201.*
Roebuck, John A. Anthopometric Methods: Designing to Fit the Human Body, Index, Chapt 5 "Forecasting & Estimating" & Chapt 9 "Clothing Design and Fit Testing" (1995).
NHANES III Reference Manuals and Report (1994) (Abstracts only).
Gordon, CC et al., Anthropometric Survey of US Army Personnel: Methods and Summary Statistics 1988 (Abstract Only).
Random House, Complete Guide to Women's Health, Atlas of the Body The Skeleton—Front View (1996).
Random House, Complete Guide to Women's Health, Atlas of the Body The Skeleton—Side View (1996).

*Primary Examiner*—William A. Cuchlinski, Jr.
*Assistant Examiner*—McDieunel Marc
(74) *Attorney, Agent, or Firm*—Medlen & Carroll, LLP

(57) ABSTRACT

An apparatus and method is provided for creating custom-fitted garments wherein the customer provides critical information which is known to or easily ascertainable by the customer without assistance. Using this critical information, a controller applies rules contained in a model to estimate other critical dimensions necessary for the production of a selected garment, and which are not easily ascertainable directly by the customer without assistance. Using the actual and estimated critical dimensions, the controller determines the pattern data which is used to produce custom-made clothing which provides a superior fit to that which a customer would typically experience from the retail purchase of a similar mass-produced garment.

20 Claims, 2 Drawing Sheets

U.S. PATENT DOCUMENTS

| | | | | |
|---|---|---|---|---|
| 3,091,861 A | | 6/1963 | Jones ............................. 33/15 |
| 3,391,392 A | | 7/1968 | Doyle ........................ 702/155 |
| 3,529,298 A | | 9/1970 | Lourie ........................ 700/131 |
| 3,566,365 A | | 2/1971 | Rawson .......................... 707/4 |
| 3,601,817 A | | 8/1971 | Abrams ......................... 2/227 |
| 3,765,349 A | | 10/1973 | Gerber .................. 112/470.13 |
| 3,766,528 A | | 10/1973 | Ichida ......................... 562/481 |
| 3,887,903 A | | 6/1975 | Martell ....................... 700/132 |
| 3,895,358 A | | 7/1975 | Pearl .............................. 700/1 |
| 3,902,182 A | | 8/1975 | Hillborg ........................ 396/3 |
| 3,939,565 A | * | 2/1976 | Bush .......................... 33/17 R |
| 4,136,452 A | | 1/1979 | McMillan ................... 33/17 R |
| 4,137,634 A | | 2/1979 | Klamar ....................... 364/468 |
| 4,149,246 A | | 4/1979 | Goldman .................... 700/132 |
| 4,184,260 A | * | 1/1980 | Brockman .................... 700/90 |
| 4,211,011 A | | 7/1980 | Jacobson ....................... 33/15 |
| 4,546,434 A | | 10/1985 | Gioello ......................... 700/90 |
| 4,586,150 A | | 4/1986 | Budziak ..................... 702/164 |
| 4,598,150 A | | 7/1986 | Burton ....................... 546/152 |
| 4,635,367 A | | 1/1987 | Vigede ....................... 33/17 R |
| 4,677,564 A | | 6/1987 | Paly et al. ................... 700/134 |
| 4,868,990 A | | 9/1989 | Steinberg ....................... 33/15 |
| 4,873,643 A | | 10/1989 | Powell et al. ............... 700/103 |
| 4,885,844 A | | 12/1989 | Chun ............................. 33/15 |
| 4,893,358 A | * | 1/1990 | Bice, Jr. ........................ 2/221 |
| 4,905,159 A | | 2/1990 | Loriot ........................ 700/132 |
| 4,916,624 A | | 4/1990 | Collins et al. .............. 700/132 |
| 4,916,634 A | | 4/1990 | Collins et al. .............. 700/132 |
| 4,926,344 A | | 5/1990 | Collins et al. .............. 700/132 |
| 4,995,514 A | | 2/1991 | Forschner ................... 206/574 |
| 5,163,006 A | | 11/1992 | Deziel ........................ 700/132 |
| 5,163,007 A | | 11/1992 | Slilaty ........................ 700/132 |
| 5,313,902 A | | 5/1994 | Shoji ........................... 112/454 |
| 5,341,305 A | | 8/1994 | Clarino et al. .............. 700/132 |
| 5,346,701 A | | 9/1994 | Boles et al. ................. 424/435 |
| 5,515,268 A | * | 5/1996 | Yoda ............................ 705/26 |
| 5,548,519 A | | 8/1996 | Park et al. ................... 700/135 |
| 5,680,314 A | | 10/1997 | Patterson et al. ........... 700/132 |
| 5,768,135 A | | 6/1998 | Park et al. ................... 700/130 |
| 5,930,769 A | * | 7/1999 | Rose ............................. 705/27 |
| 5,940,806 A | * | 8/1999 | Danial .......................... 705/26 |
| 5,950,173 A | * | 9/1999 | Perkowski ................... 705/26 |
| 5,956,525 A | | 9/1999 | Minsky .......................... 396/3 |
| 6,151,531 A | * | 11/2000 | Frankel et al. ................ 700/90 |
| 6,182,871 B1 | * | 2/2001 | Lam ........................... 223/120 |

* cited by examiner

APPARATUS AND METHOD FOR THE REMOTE PRODUCTION OF CUSTOMIZED CLOTHING

TECHNICAL FIELD OF THE INVENTION

This invention relates generally to the production of clothing and more particularly to clothing manufactured to fit a specific customer.

BACKGROUND OF THE INVENTION

For years, a problem in making custom-fitted apparel in a cost effective manufacturing system has been determining how to capture a person's body dimensions so that a piece of clothing can be constructed to fit that person well and without undue expense for the manufacturer, retailer or consumer. Apparel designed for three-dimensional objects such as a human body, can be complex to make, since changes in one dimension, such as rise or waist, in the case of trousers, may require changes in another dimension, such as the seat, in order to insure a good fit. This is typically done by using conventional grading systems.

Many consumers have trouble finding volume manufactured or ready-to-wear apparel such as trousers, that fit to their satisfaction. One cause of this is that a traditional sizing system which modifies critical dimensions, such as waist, uses relatively large increments between sizes, typically one or two inches (i.e., the difference between size 30 trousers and size 32 trousers is 2 inches at the waist). Different seat and rise sizes are usually offered to consumers via fit/cut offerings (i.e., slim, relaxed, and loose fit), and normally the choices are limited due to the large number of SKU's required. While it would be theoretically possible to manufacture and stock a large number of garments having sizes graded in small increments, the costs of maintaining large inventories in the factory/warehouse and the costs of inventorying and stocking at the retail store would be prohibitive. Consequently, only a few standard sizes are offered in most retail stores for off-the-shelf sales to consumers.

Nevertheless, there are literally thousands of combinations of waist, hips, rise and inseam measurements that are possible for a pair of trousers if a large population is to be fit well. Only one particular combination is likely to be a good fit for any given person. If any one of a person's dimensions are different from the sizes offered by a particular clothing manufacturer, finding a good fit will be difficult if not impossible. For instance, if a customer's rise dimension is either shorter or longer than the current style/cut offers, or the customer's waist is in-between the sizes offered, it will be difficult for that person to get a good fit from ready-to-wear clothing.

Hence, many consumers reject ready-to wear clothing and turn to custom fitted clothing. Conventional methods for custom fitting garments captures key body dimensions, uses these dimensions to determine the critical dimensions for the garment to be created, creates a pattern from those dimensions, and then constructs the garment. Four traditional ways have been used in the past to accomplish this:

1. Use a tape measure to measure the person for key dimensions, and then use those dimensions to create the pattern and build the garment.
2. Place the actual garment that the consumer will wear on the person and make tailoring adjustments to that garment.
3. Use an adjustable garment to capture body dimensions.
4. Use some sort of mechanical, optical or video device to capture body dimensions as a prerequisite to creating a unique pattern from which the garment will be constructed.

The first two approaches used together constitute classical custom tailoring. While generally producing a good fit, the skilled labor of the tailor or seamstress required for traditional custom tailoring makes it too costly for manufacturers and retailers of ready to wear clothing to use, and too expensive for many consumers.

Adjustable try-on garments or patterns are known in the art and have been used to address the problem. These may also require skilled labor at the retail site in order for adjustments to be made properly. Whether only one adjustable garment is used, or even several adjustable garments in a standardized sizing scheme, a considerable amount of labor and expense still remains to cut and assemble the garment since each garment must be uniquely cut to the dimensions adjusted for on each customer. The use of computers can speed up the collection of the information that needs to be transmitted about the adjustments to be made, but the unique cutting requirements are still costly and time-consuming. Even where computers are used to create a pattern based on actual measurements, the costs and time for uniquely cutting to those dimensions usually remains significant.

Materials such as denim, leather, vinyl, fur, or others that are difficult to work with, complicate the problem further. If the garment is not cut satisfactorily the first time, it may be prohibitively expensive to adjust it to fit if the customer is dissatisfied with the fit of the actual garment.

Additionally, optical or electrical sensors and a computer have been used to improve accuracy of a customer's measurements. In this type of scheme, the optical or electronic device is used to sense and capture the measurements of a person's body. In one system, the individual wears a special garment having measuring devices that can be "read" by the system. This can be combined with a computer system which creates and grades or scales a pattern using the information provided by the readings. Thus, measurements can be taken or made interactively and accurately, but each garment must still be cut to the unique dimensions so ascertained. While the use of optical and electrical measuring devices improves accuracy and collection of the information regarding the customer's body dimensions, such devices are expensive, require skilled operators, and do not solve the remaining problems and costs of unique cutting and assembly facing the volume manufacturer. Volume manufacturers may make as many as 60,000 or 70,000 pairs of pants a week in factories around the world. Costs have typically been kept low with the use of a limited number of standard sizes and standard styles/cuts, which lower or eliminate the need for specially skilled labor, and also limit the need for specialized and unique cutting and tracking methods. Custom tailoring done according to the traditional methods is inconsistent with high volume manufacturing and low costs.

U.S. Pat. Nos. 5,548,519 and 5,768,135, which are incorporated herein by reference, disclose a system for fitting customers to one of a plurality of pre-determined garment patterns using try-on garments which correspond to at least some of the pre-determined garment patterns. An initial try-on is identified by the system using the customer's critical fit dimensions for a selected type of garment, then additional try-ons are identified based upon customer fit preference.

With each of these methods, a trained person, such as a tailor or a clerk, is required to take at least some measurements (which the customer cannot easily determine unaided). For example, an accurate hip, rise and/or seat measurement can be extremely difficult, if not impossible, for a customer to determine unaided, and measurements such as inseam or outseam can be tricky. Very often, customers feel embarrassed or awkward when such measurements are taken by another person, and this can lead to reluctance to obtain custom-fitted clothing.

Accordingly, the need exists for a manufacturing system which can produce customized clothing using measurements which a customer can easily determine without assistance, and which will reasonably accurately estimate the remaining necessary measurements which the customer cannot easily determine alone, so that the customer can order good-fitting custom sewn garments without the assistance of a tailor or clerk.

SUMMARY OF THE INVENTION

The present invention provides a manufacturing system and method for the production of customized garments. The system prompts the customer to provide information regarding critical fit dimensions which the customer can easily and substantially accurately determine without assistance, and then uses that customer input to reasonably accurately estimate other critical fit dimensions necessary to produce reasonably good fitting, custom manufactured garments, so that the customer can order reasonably good-fitting custom sewn garments without the assistance of a tailor or clerk.

In one embodiment, the present invention provides an apparatus for manufacturing a garment for a specific customer using measurements provided by that customer, including a controller, a means linked to the controller for communicating with the customer and for prompting the customer to enter known or easily ascertained information relating to some of the customer's critical dimensions needed to manufacture a selected garment, a storage means in communication with the controller and containing rules for estimating at least one critical fit dimension needed to manufacture the selected garment based upon a relevant dimension which the customer can easily determine without assistance, such as shoe size, a means for creating pattern data from said critical dimensions, and, a means for transmitting the pattern data to a production facility for cutting and assembly to produce the garment style selected by the customer.

In another embodiment, the present invention provides an apparatus for creating pattern data which can be used to create a custom garment selected by a customer. The apparatus of this embodiment includes a controller, a means linked to the controller for communicating with the customer and prompting the customer to enter information relating to critical dimensions which the customer knows or can easily ascertain substantially accurately without assistance, a storage means linked to said controller and containing rules for estimating at least one critical fit dimension needed to create the pattern data for the selected garment based upon a relevant dimension which the customer can substantially accurately determine without assistance, and a program for creating a pattern from the identified and calculated critical fit dimensions.

In yet another embodiment, the present invention provides a method for creating pattern data which can be used to create a custom garment intended to fit a specific customer, including the steps of:

storing in a computer at least one generic pattern and identifying on said pattern the critical dimensions which can then be used to scale remaining pattern points to create a desired garment;

identifying to the customer each kind of garment for which a generic pattern has been stored in said computer, and allowing the customer to choose a garment to be produced;

based upon the garment chosen by the customer, prompting the customer to provide information relating to the critical dimensions required to scale the stored pattern corresponding to the selected garment;

using rules stored in the computer and information furnished by the customer to estimate at least one critical dimension required to create the custom garment; and, produce a custom pattern from the base pattern by using the critical dimensions and grading the remaining pattern points using a conventional pattern production program.

Other and further objects, features, advantages and embodiments of the present invention will become apparent to one skilled in the art from reading the Detailed Description of the Invention together with the drawings.

DETAILED DESCRIPTION OF THE INVENTION

One purpose of the present invention is to provide custom-made clothing which provides a superior fit to that which a customer would typically experience from the retail purchase of a similar mass-produced garment. In order to provide a superior custom-fit, it is necessary to have knowledge of some of the customer's body dimensions. Another purpose of the present invention is to provide a system for obtaining information from the customer alone, without assistance from another person, which will provide some of the critical fit dimensions or other information sufficient to enable the calculation of other critical fit dimensions, thus enabling the customer to remotely order custom fit garments using, for example, the internet.

Figure 1:
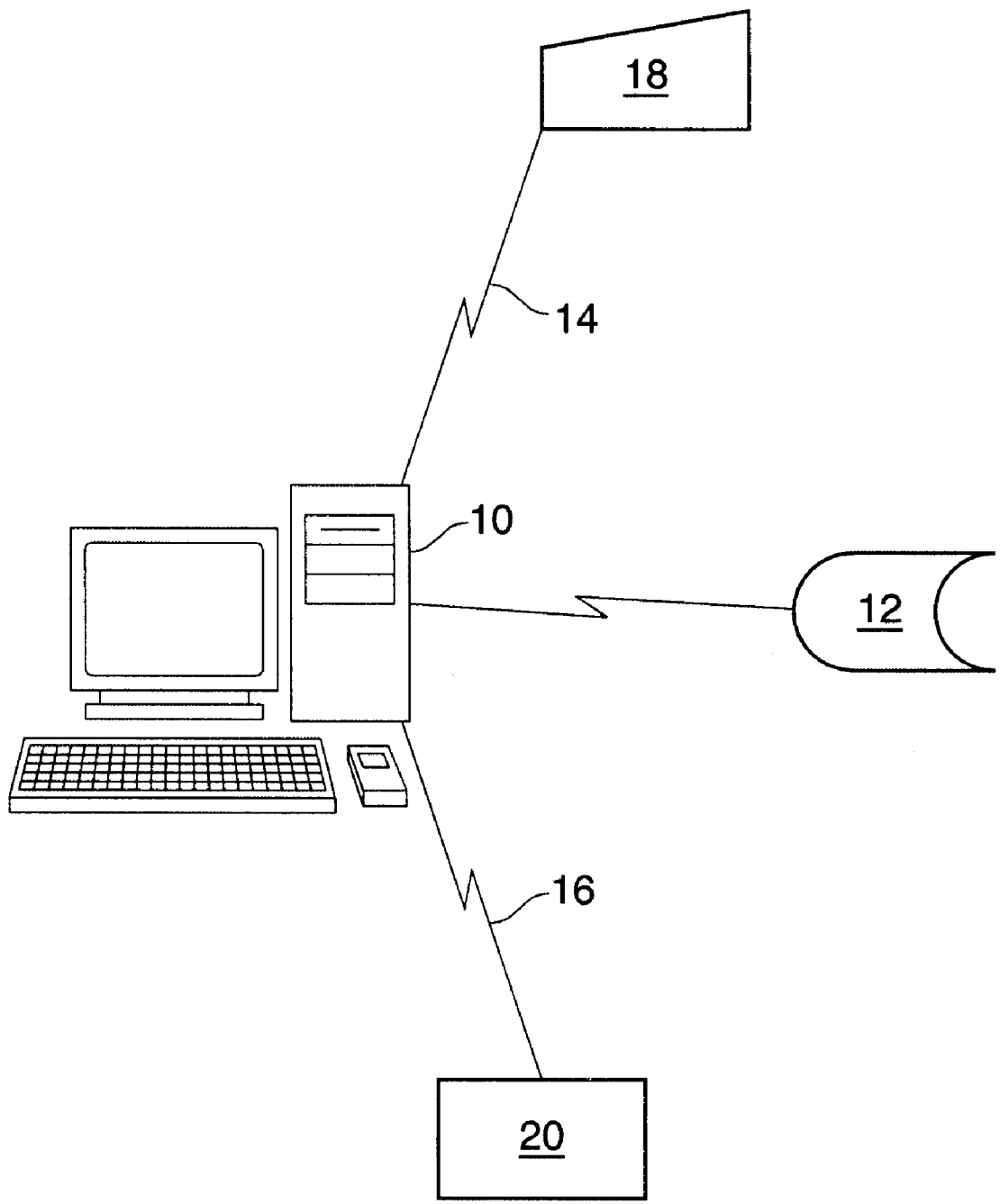
FIG. 1 is a schematic showing the components of an apparatus of the present invention.

As shown in FIG. 1, the apparatus of the present invention is greatly simplified from that in the prior art. The present invention includes a computer or controller 10 which is linked, via interface 14, to a customer. Controller 10 is preferably a PC-based system which can be linked via any conventional interface. Interface 14 is most preferably a modem, but may also be a hard wire link. Less preferably, interface 14 is a manual communications means, such as, for example, a paper order form which is transmitted by fax or mail to a computer operator who enters the critical information into controller 10 using, for example, a keyboard, touch screen, voice recognition hardware and software, or scanner.

Controller 10 is electronically linked to computer storage 12. Computer storage means 12 can be formed from any conventional memory storage means such as, for example, ROM, RAM, magnetic tape, magnetic disks, and the like. Computer storage means 12 can be used to store information relating to base patterns for each kind of garment to be offered for sale, queries regarding critical information needed to create pattern data, and rules for estimating at least one critical dimension which cannot easily be determined by a customer without assistance.

In the preferred embodiment, the apparatus of the present invention is used for generating custom-fitted pattern data for trousers. The critical fit dimensions for trousers are waist, hips (also called "seat"), rise, inseam, crotch height, and outseam. The present invention uses a unique predictive fitting model that takes characteristics, such as weight, height, waist, inseam, and shoe size which are reported by the customer, and uses them to predict other critical dimensions necessary to producing properly fitting garments. In addition, the model can also use some of the reported characteristics to validate other reported dimensions or to catch occasional reporting errors. A primary example is trouser waist size. Although customers can usually supply a waist size, experience has shown a tendency by customers to underestimate their actual waist size. Because the statistical models are based upon designed experiments, where the actual subject dimensions were physically measured, the statistical models have the ability to adjust the reported waist size to a more accurate waist size for the construction of trousers.

The preferred model of the present invention is based upon a statistical methodology commonly referred to as Design of Experiments. Design of Experiments is conventionally used in diverse technical disciplines such as, for example, agronomy, chemical engineering, and semiconductor manufacturing to improve existing products or invent new ones. The present application of Design of Experiments methodology to garment fitting studies is believed to be unique. As a result, the preferred model developed using Design of Experiments methodology allows accurate estimates of multivariate relationships between the different dimensions of the human body, while minimizing the resources necessary to generate the statistical estimates.

The preferred model begins with dimensions which can be easily determined and reported by the customer. For trousers, such characteristics preferably include height, weight, waist, inseam, and shoe size. Most customers know, or can easily determine without the aid of another person, their height, weight and waist. The inseam, while not typically easily obtained in a similar fashion by the unaided customer, can be fairly accurately determined based upon the size of clothing owned by the customer which fits well. However, determination of the seat, crotch height, and outseam is very difficult for the unaided customer to determine, since the exact location of the measurement to be taken may vary depending upon the design of the trousers. Accordingly, the preferred model includes rules for estimating dimensions such as seat, crotch height, and outseam, and for verifying reported dimensions such as waist and inseam. The estimates are based upon strong correlations between different parts of the body. For example, a strong correlation has been shown to exist between the knee height and upper arm length. In the present invention, the strong correlation between the length of the femur and the length of the foot forms the basis which enables the prediction of trouser dimensions such as crotch height and outseam.

While a customer ordering trousers typically knows his or her height, weight and waist size, they probably do not know their foot length. Accordingly, the preferred model provides an appropriate coefficient for applying to the shoe size in order to factor the foot size into the model. Of course, it would be possible to modify the model to use foot size directly, rather than shoe size, by converting shoe size into foot length using the following linear equation:

Foot Length=7.29+[0.338×$SR$ shoe size]

Where SR shoe size is the self reported shoe size.

Additional rules, based on regression analysis, can be applied which use the shoe size (or estimated foot length) as a factor in predicting dimensions which the customer typically does not know—crotch height and outseam.

There is also a strong correlation between the proportion of lean and fat body masses which are used to predict such trouser characteristics as waist and seat. Accordingly, height, weight, inseam and waist measurements reported by the customer are factored into the estimates to enable the prediction of dimensions such as waist and seat. The preferred model used in the present invention to predict body dimensions includes a "conicity index," referred to hereinafter as "C-Index". The C-Index is used by some anthropometricians as a mathematical descriptor of the body shape. Body shapes range from a perfect cylinder to a double cone. The C-Index helps to define the body shape in the region of the waist. C-Index is preferably calculated using the following formula:

$C$-Index=($SR$ Waist*0.0254)/(0.109*√[($SR$ Weight/2.2)/($SR$ Height*0.0254)]

where SR Height is the "self-reported" height (e.g., the height reported by the customer) and SR Waist is the self-reported waist size.

Another calculated variable which is useful in the preferred model is the calculation for body mass index (BMI). BMI helps to define the proportion of dense body mass to fat body mass, which is particularly useful in predicting the size of the seat and the waist. BMI is preferably calculated by dividing the self-reported weight by the square of the self-reported height and multiplying the result by 100:

$BMI$($SR$ Weight/$SR$ Height$^2$)*100

Yet another calculated variable which helps to define the height location of the waist is Height Proportion, Ht Prop, which is calculated as follows:

Ht Prop=[($SR$ Height−$SR$ Inseam)/$SR$ Height]*100

Once these variables have been calculated, they can be used in the preferred model, along with the self-reported dimensions, to calculate the following critical dimensions:

Predicted Waist=−13.3037+(2.54*$BMI$)+(10.29*$C$-Index)+(0.15*Ht Prop)+(0.02*$SR$ Height)+(0.03*$SR$ Weight)+(0.36*$SR$ Waist)−(0.04*$SR$ Inseam)+(0.06*$SR$ Shoe Length)

Predicted Seat=3.5504+(1.9891*$BMI$)+(1.2397*$C$-Index)+(0.0823*Ht Prop)+(0.1001*$SR$ Height)+(0.0272*$SR$ Weight)+(0.2472*$SR$ Waist)+(0.0983*$SR$ Inseam)−(0.0597*$SR$ Shoe Length)

Predicted Outseam=12.25−(3.0495*$BMI$)−(17.993*$C$-Index)+(0.1259*Ht Prop)+(0.3139*$SR$ Height)−(0.0096*$SR$ Weight)+(0.6398*$SR$ Waist)+(0.4003*$SR$ Inseam)−(0.0783*$SR$ Shoe Length)

Predicted Crotch Height=3.50−(3.5303*$BMI$)−(20.8354*$C$-Index)+(0.1346*Ht Prop)+(0.3127*$SR$ Height)−(0.0156*$SR$ Weight)+(0.7890*$SR$ Waist)+(0.4033*$SR$ Inseam)−(0.0230*$SR$ Shoe Length)

Predicted Hip Differential=Predicted Seat−Predicted Waist

Predicted Rise=Predicted Outseam−Predicted Crotch Height

All length measurements (such as height, waist, inseam) used in the preferred model are in inches. Weight measurements used in the preferred model are in pounds.

To illustrate the determination of the critical dimensions, a specific, actual example is set forth below. In this example, the customer reported the following dimensions:
SR Height: 5 foot 6 inches (66 inches)
SR Weight: 195 pounds
SR Waist 37 inches
SR Inseam: 30 inches SR Shoe Length: Size 9
Using the preferred equations set out above,
BMI=4.48
C-Index=1.18, and
Ht Prop=54.55
Applying these calculated values, along with the self-reported dimensions, the following critical garment dimensions are predicted using the preferred model:
Predicted Waist=38.23 inches
Predicted Seat=41.88 inches
Predicted Outseam=38.05 inches
Predicted Crotch Height=29.12 inches
Predicted Hip Differential=3.65 inches
Rise=8.93 inches It should be noted that the predicted waist is somewhat larger than the reported waist. As noted above, it is not unusual that customers may understate their actual waist size. However, the model predicts the likely waist using other body dimensions to achieve a predicted waist which is actually used in producing the garment. In this example, trousers were produced for the customer using the predicted waist in lieu of the reported waist, and was found by the customer to fit well in the waist.

Once all critical dimensions are known, pattern data can be derived. Preferably, pattern data is derived by scaling a pattern using a conventional grading program (such as, for example, a program like that described in U.S. Pat. No. 4,916,624 to Collins et al. or U.S. Pat. No. 5,341,305 which uses the critical dimensions and grading the remaining pattern points to the critical dimensions. Such grading programs can also compensate for a desired level of ease and expected fabric shrinkage, based upon the type of fabric used to create the selected garment. For example, when producing Khaki Trousers, which are intended to provide a relaxed fit, approximately five inches can be added to the calculated seat dimension during the pattern creation process to create the desired level of ease.

Alternatively, it would also be possible to determine the pattern data by matching the critical dimensions calculated to the closest predetermined pattern in a grid of predetermined patterns, as described in U.S. Pat. Nos. 5,548,519 and 5,768,135.

As shown in FIG. 1, controller 10 is linked electronically to a production facility where the pattern data is transmitted and used to operate a conventional cutting machine for cutting out parts from selected fabric. The cut parts are sewn together to create a custom-fitted garment for the customer. The custom-fitted garment can then be provided with an appropriate conventional finish, which can be selected in advance by the customer inspected, and delivered to the customer.

Figure 2:
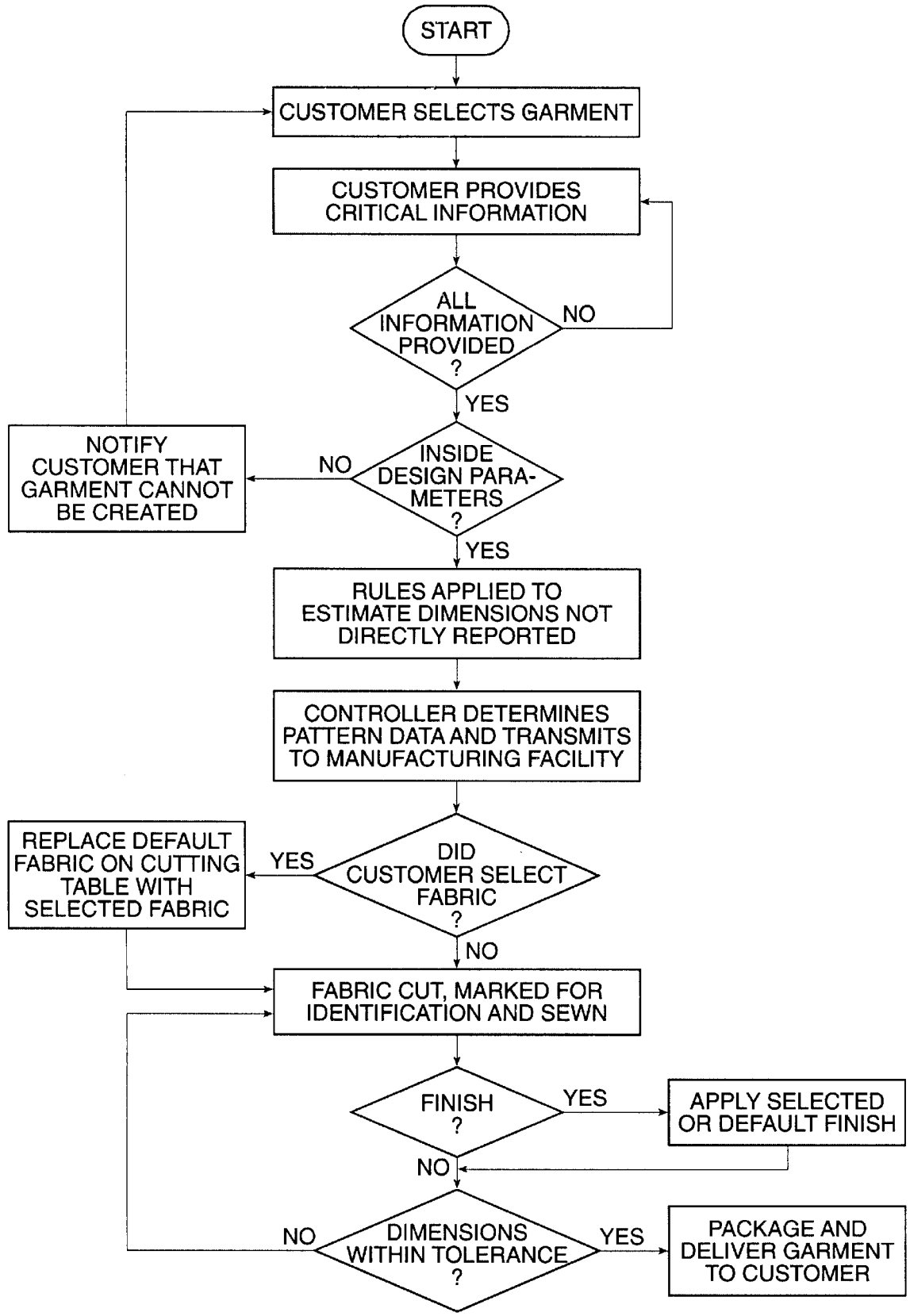
FIG. 2 is a process chart explaining the preferred method of the present invention.

As shown in FIG. 2, the process preferably begins when the customer selects a particular garment to be produced. The customer is queried to provide certain critical information needed to estimate certain dimensions and to create the pattern data for the selected garment. For trousers, the critical information includes height, weight, waist, shoe size, and inseam. For shirts or jackets, the critical information could include height, weight, waist, shoe size, and collar size (with sleeve length and any other critical dimensions predicted using a model developed using Design of Experiments methodology). Alternatively, where the choice is between different styles of a garment like pants, the process can be reversed and the critical information (which will be the same for each style) can be obtained before the style is chosen.

Once all required information has been provided, the controller determines if the customer is within the design parameters for the particular garment. Certain garments may be designed in such a way that it is not possible to fit individuals who are too large or too small, or who have a body with unusual proportions. Accordingly, the controller is preferably provided with upper and lower limits which can be used to identify customers who are outside the design parameters of certain garments and who simply cannot be fitted. Once the controller verifies that the individual is within the design parameters, the rules are applied to create the estimated critical dimensions. Then, the controller preferably uses the estimated and actual critical dimensions to determine the pattern data. The pattern data is transmitted to a production facility, where it is used by a cutting machine to cut the individual fabric pieces which will be sewn together to create the ordered garment. Prior to cutting, the fabric selected by the customer (or the default fabric selection identified by the controller) will be placed on the cutting table. The fabric pieces will then be cut and preferably marked for identification. Following cutting, the fabric pieces are conventionally sewn together to create the desired garment. After sewing, the garment can be conventionally finished (either a default finish, or, if the customer has selected a specific finish, then the finish selected by the customer). For the purposes of this application, finishing can include, for example, the application of a permanent press resin to the garment, stone-washing or other abrasion of the exterior surface of the garment, creating 3-dimensional effects in the fabric of the garment, bleaching, dyeing, printing or softening of the garment, or laser alteration of the surface of the garment, followed by attachment of labels and tags.

After finishing, the garment is preferably inspected by a quality control inspector. This is preferably done using a measurement system such as that disclosed in U.S. Pat. No. 5,691,923, which is incorporated herein by reference, and which can receive the critical dimensions from the controller 10, and then indicate to the quality control ("QC") inspector whether the garment being inspected is within standard or special tolerances.

Once the garment passes a Quality Control inspection, it may receive final packaging and be delivered to the customer.

While the present system is particularly adaptable for use in creating an internet based, on-line ordering system for custom-fitted garments, it could also be used in a more conventional mail order system or on a kiosk located in a retail store. The system described herein is particularly useful since the customer is not required to obtain the assistance of any other person in determining any dimension requested. Rather, the customer is queried to provide information which is known or easily ascertainable without assistance. The system then applies the rules discussed in detail above to estimate one or more critical dimensions, and then uses the actual and estimated critical dimensions to create the pattern data used to create the custom-fitted garment.

One skilled in the art will recognize at once that it would be possible to construct the present invention from a variety of materials and in a variety of different ways. While the preferred embodiments have been described in detail, and shown in the accompanying drawings, it will be evident that various further modification are possible without departing from the scope of the invention as set forth in the appended claims.

What is claimed is:

1. An apparatus for manufacturing a garment for a specific customer using measurements provided by that customer, comprising:

a controller;

a means in communication with said controller for prompting the customer to enter critical fit information relating to the customer's dimensions needed to manufacture a selected garment, said critical fit information being easily determined by the customer without assistance;

a storage means in communication with said controller and containing rules for using said critical fit information for estimating at least one critical fit dimension needed to manufacture said selected garment;

a means for using each critical fit dimension to determine pattern data; and, a means for transmitting said pattern data to a production facility where said data is used for cutting the fabric parts which are subsequently sewn together to produce the garment selected by the customer.

2. The apparatus of claim 1 wherein said selected garment is a pair of trousers.

3. The apparatus of claim 2 wherein said rules for estimating require information regarding the customer's dimensions, including foot size.

4. The apparatus of claim 1 wherein said means in communication with said controller is a modem linked to a computer through the internet.

5. The apparatus of claim 1 wherein said critical information includes height, weight, waist, shoe size and inseam.

6. The apparatus of claim 5 wherein said means for determining pattern data comprises a scalable base pattern for each selectable garment and conventional software for grading said base pattern to produce said pattern data.

7. The apparatus of claim 1 wherein said storage means is one or more selected from the group consisting of: online storage, offline storage, magnetic diskettes, magnetic tape, Random Access Memory (RAM), Read Only Memory (ROM), bubble memory, Compact Discs (CDs), and Digital Video Disks (DVDs).

8. An apparatus for creating pattern data which can be used to create a custom garment selected by a customer, the apparatus comprising:

a controller;

a means in communication with said controller for communicating with the customer and prompting the customer to enter critical fit information relating to dimensions needed to create the pattern data for a selected garment, said critical fit information being information which the customer can easily ascertain substantially accurately without assistance;

a storage means in communication with said controller containing rules for using said critical information to estimate critical fit dimensions needed to create the pattern data for the selected garment; and, a means for creating pattern data using said critical fit dimensions.

9. The apparatus of claim 8 wherein the selected garment is a pair of trousers, and the critical fit information includes height, weight, waist dimension, inseam and shoe size.

10. The apparatus of claim 9 wherein said rules are used to estimate a customer's critical fit dimensions including outseam, rise, waist and inseam.

11. The apparatus of claim 8 wherein said storage means is one or more selected from the group consisting of: online storage, offline storage, magnetic diskettes, magnetic tape, Random Access Memory (RAM), Read Only Memory (ROM), bubble memory, Compact Discs (CDs), and Digital Video Disks (DVDs).

12. The apparatus of claim 8 wherein said means for creating pattern data comprises a scalable base pattern for each selectable garment and conventional software for grading said base pattern to produce said pattern data.

13. The apparatus of claim 8 wherein said means in communication with said controller comprises a modem linked to a computer through the internet.

14. A method for creating pattern data which can be used to create a custom garment intended to fit a specific customer, the method comprising the steps of:

storing in a computer at least one base pattern and identifying on said pattern critical dimensions which can then be used to scale remaining pattern points to create a custom pattern;

establishing communication with a customer;

prompting the customer to provide critical fit dimensions required to scale the base pattern corresponding to a selected garment, the critical fit dimensions limited to that which the customer can easily determine without assistance;

using rules stored in the computer and information furnished by the customer to estimate other critical fit dimensions which cannot be easily determined by the customer and which are required to scale the base pattern corresponding to the garment; and, producing custom pattern data from the base pattern by using the provided and estimated critical fit dimensions and grading the remaining pattern points of the base pattern using a conventional pattern grading program.

15. The method of claim 14 additionally comprising the step of storing a plurality of different base patterns in said computer, identifying to the customer each kind of garment for which a base pattern has been stored in said computer, and allowing the customer to choose a garment to be produced.

16. The method of claim 14 additionally comprising the step of allowing the customer to select the kind of fabric from which the garment will be produced.

17. The method of claim 14 additionally comprising the step of allowing the customer to select the kind of finish to be applied to the garment.

18. The method of claim 14 wherein the step of establishing communication with a customer includes providing an electronic link between the computer and a computer operated by the customer.

19. The method of claim 18 wherein said link is established through the internet.

20. The method of claim 14 wherein the selected garment is a pair of trousers, and the critical information reported by the customer includes height, weight, waist size, inseam and shoe size.

* * * * *

UNITED STATES PATENT AND TRADEMARK OFFICE
CERTIFICATE OF CORRECTION

| | | |
|---|---|---|
| PATENT NO. | : 6,353,770 B1 | Page 1 of 1 |
| DATED | : March 5, 2002 | |
| INVENTOR(S) | : Philip J. Ramsey et al. | |

It is certified that error appears in the above-identified patent and that said Letters Patent is hereby corrected as shown below:

<u>Column 6,</u>
Line 27, the formula needs an equal sign [=]. Should read as follows:

$BMI=(SR \text{ Weight}/SR \text{ Height}^2)*100$

Signed and Sealed this

Fourth Day of June, 2002

*Attest:*

*Attesting Officer*

JAMES E. ROGAN
*Director of the United States Patent and Trademark Office*